United States Patent
Arnold et al.

(10) Patent No.: US 9,384,647 B1
(45) Date of Patent: Jul. 5, 2016

(54) SOUND, TEMPERATURE AND MOTION ALARM FOR VEHICLE OCCUPANTS AND PETS

(71) Applicant: All Distributors, LLC, Murfreesboro, TN (US)

(72) Inventors: Bettye Arnold, Murfreesboro, TN (US); Mark Best, Merritt Island, FL (US)

(73) Assignee: All Distributors, LLC, Murfreesboro, TN (US)

( * ) Notice: Subject to any disclaimer, the term of this patent is extended or adjusted under 35 U.S.C. 154(b) by 11 days.

(21) Appl. No.: 14/317,326

(22) Filed: Jun. 27, 2014

Related U.S. Application Data

(63) Continuation-in-part of application No. 14/087,408, filed on Nov. 22, 2013, which is a continuation-in-part of application No. 13/757,050, filed on Feb. 1, 2013, which is a continuation-in-part of application No. 13/646,030, filed on Oct. 5, 2012.

(51) Int. Cl.
*G08B 21/08* (2006.01)
*B60Q 5/00* (2006.01)

(52) U.S. Cl.
CPC ............... *G08B 21/08* (2013.01); *B60Q 5/001* (2013.01); *B60Q 5/005* (2013.01)

(58) Field of Classification Search
CPC .............. F16D 2066/001; G08B 21/22; G08B 13/1436; B60K 35/00; B60K 37/02; F01P 11/16
USPC ........... 340/449, 522, 573.1, 425.5, 457, 438, 340/581, 584
See application file for complete search history.

(56) References Cited

U.S. PATENT DOCUMENTS

| | | | |
|---|---|---|---|
| 4,872,828 A * | 10/1989 | Mierzwinski et al. | 431/16 |
| 5,510,765 A * | 4/1996 | Madau | 340/541 |
| 5,682,144 A * | 10/1997 | Mannik | 340/575 |
| 5,686,896 A | 11/1997 | Bergman | |
| 5,793,291 A * | 8/1998 | Thornton | 340/573.1 |
| 5,873,256 A * | 2/1999 | Denniston | 62/91 |
| 5,890,085 A | 3/1999 | Corrado | |
| 5,949,340 A | 9/1999 | Rossi | |
| 5,969,600 A | 10/1999 | Tanguay | |
| 6,026,340 A * | 2/2000 | Corrado et al. | 701/47 |

(Continued)

OTHER PUBLICATIONS

Fox, Devices Can't Save Babies in Hot Cars, Agency Warns, NBC News, 2012, retrieved on Jul. 31, 2012, retrieved from http://vitals.nbcnews.com/_news/2012/07/30/13033698-devices-cant-save-babies-in-hot-cars-agency-warns?lite, 7 pages.

(Continued)

*Primary Examiner* — An T Nguyen
(74) *Attorney, Agent, or Firm* — Brian S. Steinberger; Law Offices of Brian S. Steinberger, P.A.

(57) ABSTRACT

Systems, devices and methods of using sound detectors, motion detectors and temperature sensors inside vehicles for activating alarms to protect vehicle occupants that include babies, children, infirm, elderly and pets. Headrest mounted sound detector(s), motion detector(s) and temperature sensor are used wherein detected sound from the sound detector can activate the motion temperature sensor and motion detected to activate adjacent or remote alarms. when unsafe cold and warm interior vehicle temperatures are reached. Low battery indicators such as audible alarms, chirp sounds and lights can be used to indicate low battery power supplies.

19 Claims, 12 Drawing Sheets

(56) References Cited

U.S. PATENT DOCUMENTS

| | | | |
|---|---|---|---|
| 6,028,509 A * | 2/2000 | Rice | 340/449 |
| 6,624,750 B1 * | 9/2003 | Marman et al. | 340/506 |
| 6,639,512 B1 * | 10/2003 | Lee et al. | 340/438 |
| 6,768,420 B2 * | 7/2004 | McCarthy et al. | 340/573.1 |
| 6,812,844 B1 | 11/2004 | Burgess | |
| 6,847,302 B2 | 1/2005 | Flanagan | |
| 6,922,147 B1 * | 7/2005 | Viksnins et al. | 340/573.1 |
| 6,922,622 B2 | 7/2005 | Dulin | |
| 6,998,988 B1 * | 2/2006 | Kalce | 340/573.1 |
| 7,104,661 B2 | 9/2006 | Kane | |
| 7,170,401 B1 * | 1/2007 | Cole | 340/457 |
| 7,265,678 B2 * | 9/2007 | Chapman et al. | 340/636.11 |
| 7,348,880 B2 * | 3/2008 | Hules et al. | 340/522 |
| 7,592,905 B2 * | 9/2009 | Barton et al. | 340/457 |
| 7,701,358 B1 | 4/2010 | White | |
| 2002/0121967 A1 | 9/2002 | Bowen et al. | 340/425.5 |
| 2002/0140214 A1 * | 10/2002 | Breed et al. | 280/735 |
| 2002/0161501 A1 * | 10/2002 | Dulin et al. | 701/45 |
| 2003/0122662 A1 * | 7/2003 | Quinonez | 340/457 |
| 2003/0132838 A1 * | 7/2003 | Toles | 340/457 |
| 2003/0169162 A1 * | 9/2003 | Hyman | 340/438 |
| 2004/0089005 A1 * | 5/2004 | Ichishi et al. | 62/214 |
| 2005/0024188 A1 * | 2/2005 | Sider | 340/425.5 |
| 2005/0225440 A1 | 10/2005 | Simmons | |
| 2005/0275260 A1 | 12/2005 | Patterson | |
| 2006/0033634 A1 * | 2/2006 | Best | 340/666 |
| 2006/0267780 A1 * | 11/2006 | Adams | 340/573.1 |
| 2007/0013531 A1 * | 1/2007 | Hules et al. | 340/584 |
| 2007/0045444 A1 * | 3/2007 | Gray et al. | 236/94 |
| 2007/0096891 A1 | 5/2007 | Sheriff | |
| 2008/0125941 A1 * | 5/2008 | Mitteer | 701/46 |
| 2008/0157985 A1 * | 7/2008 | Wilson | 340/584 |
| 2009/0174774 A1 | 7/2009 | Kinsley | |
| 2009/0204297 A1 * | 8/2009 | Friedman | 701/46 |
| 2009/0277190 A1 | 11/2009 | Piette | |
| 2010/0090836 A1 | 4/2010 | Trummer | |
| 2011/0074565 A1 * | 3/2011 | Cuddihy et al. | 340/457 |
| 2014/0015971 A1 * | 1/2014 | DeJuliis | 348/148 |

OTHER PUBLICATIONS

National Highway Traffic Safety Administration, U.S. Department of Transportation, Reducing the Potential for Heat Stroke to Children in Parked Motor Vehicles: Evaluation of Reminder Technology, Jul. 2012, 42 pages.

Barth, Warning Systems to Detect Children Left in Hot Cars Found Unreliable, Study Finds, Aug. 1, 2012, Consumer Reports News, retrieved on Nov. 19, 2013, retrieved from http://www.consumerreports.org/cro/news/2012108/warning-systems-to-detect-children-le . . ., 1 page.

Stenquist, How to Remind a Parent of the Baby in the Car?, May 28, 2010, The New York Times, retrieved on Nov. 19, 2013, retrieved from http://www.nytimes.com/2010/05/30/automobiles/20HEAT.html?pagewanted=all&_. . ., 4 pages.

Booth, et al., Hyperthermia Deaths Among Children in Parked Vehicles: An Analysis of 231 Fatalities in the United Stated, 1999-2007, Mar. 4, 2010, Forensic Sci Med Pathol, pp. 99-105, vol. 6.

KidsandCars.org, retrieved on Nov. 19, 2013, retrieved from http://www.kidsandcars.org/heatstroke.html, 5 pages.

Johnson, Where's the Baby? Forgotten in the Hot Car, Jul. 17, 2012, CBN News Medical Reporter, 4 pages.

Devices Exist to Keep Kids from Dying in Cars, but Few are Sold, 2007, The Associated Press, 2 pages.

Grundstein, et al., Quantifying the Heat-Related Hazard for Children in Motor Vehicles, Sep. 2010. American Meteorology Society, pp. 1183-1191.

Smart Technology for Responsible Parents, Backseat Minder, retrieved on Nov. 19, 2013, retrieved from http://www.backseatminder.com/index.html, 2 pages.

Suddenly Safe 'N' Secure Systems, Inc., retrieved on Nov. 19, 2013, retrieved from http://shop.suddenlysafensecuresystems.com/, 2 pages.

Currier, St. Louis Inventors Offer Car-Seat Monitor to Prevent Child Deaths, Jun. 22, 2013, retrieved on Nov. 19, 2013, retrieved from http://www.stltoday.com/news/local/crime-and-courts/st-louis-inventors-offer-car-seat-m . . ., 2 pages.

Car Seat Monitor, Keep Your Child Safe and Comfortable, retrieved on Nov. 19, 2013, retrieved from http://carseatmonitor.com, 2 pages.

ChildMinder, Infant-Toddler Elite Pad System, retrieved on Nov. 19, 2013, retrieved from http://babyalert.info/, 1 page.

Halo Baby Seat Safety Systems, retrieved on Nov. 19, 2013, retrieved from http://sistersofinvention.com, 15 pages.

Osborne, Camden Police Dog's Death, Tied to Temperature Alarm System's Failure, Raises Concerns, Aug. 15, 2012, retrieved in Oct. 15, 2013, retrieved from, http://articles.philly.com/2012-08-15/news/33201656_1_air-conditioner-police-dog-k-9, 2 pages.

O'Toole, Hypothermia: A Real Winter Danger, 2013, retrieved from http://www.backwoodshome.com/articles2/otoole84/html, 4 pages.

Arnold, B., U.S. Appl. No. 13/757,050, filed Feb. 1, 2013, Office Action Summary mailed Dec. 24, 2014, 23 pages.

Arnold, B., U.S. Appl. No. 13/646,030, filed Oct. 5, 2012, Office Action Summary mailed Nov. 20, 2014, 16 pages.

* cited by examiner

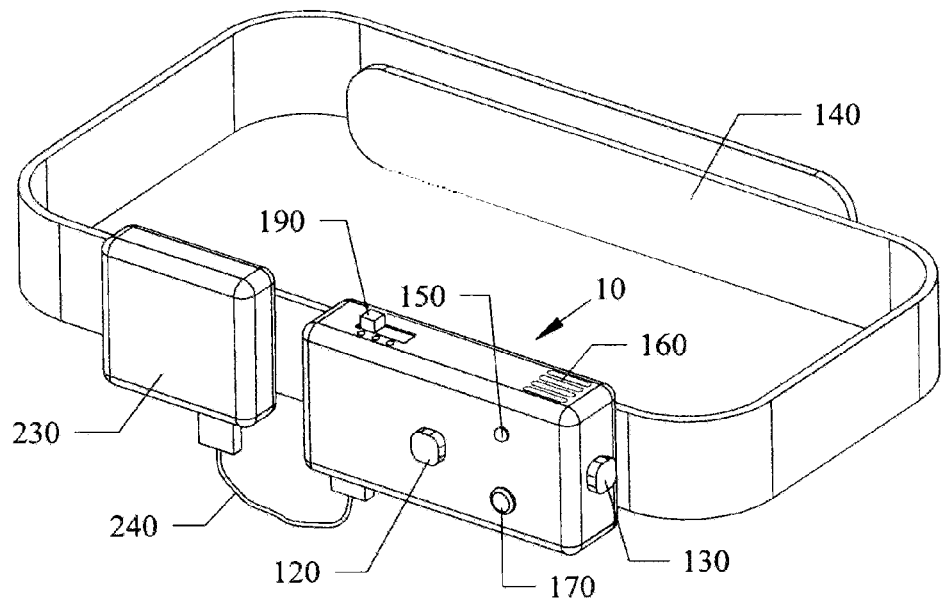
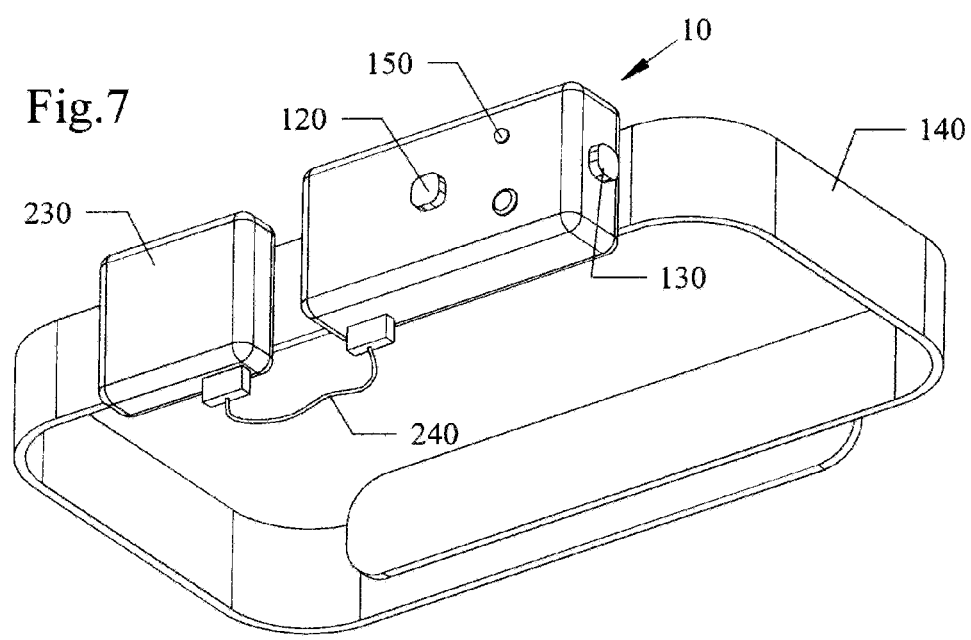

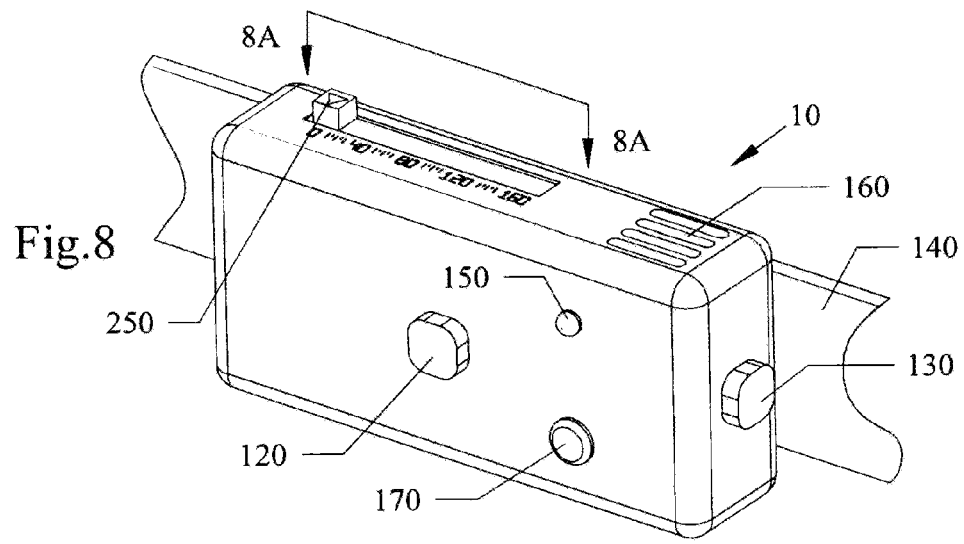
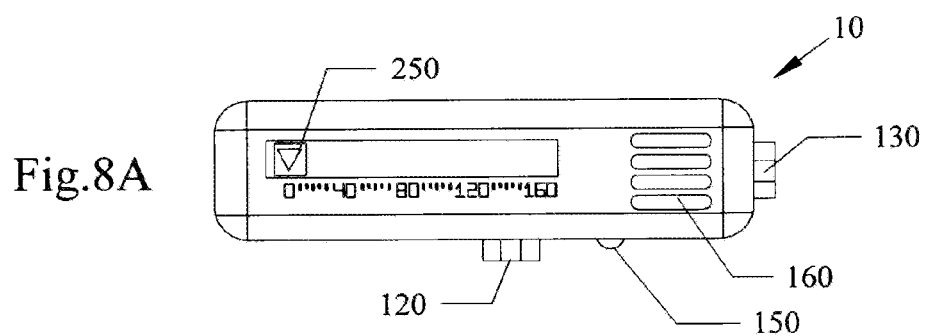
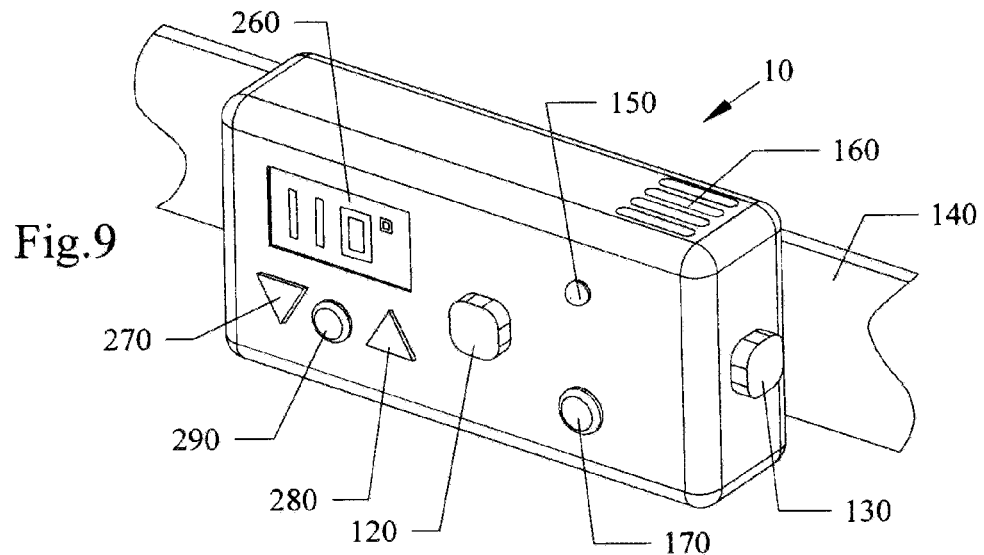

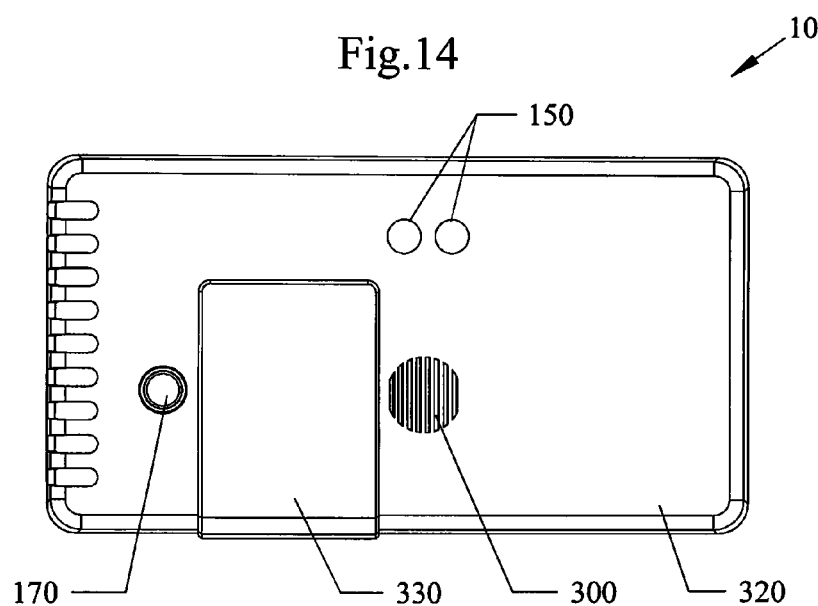
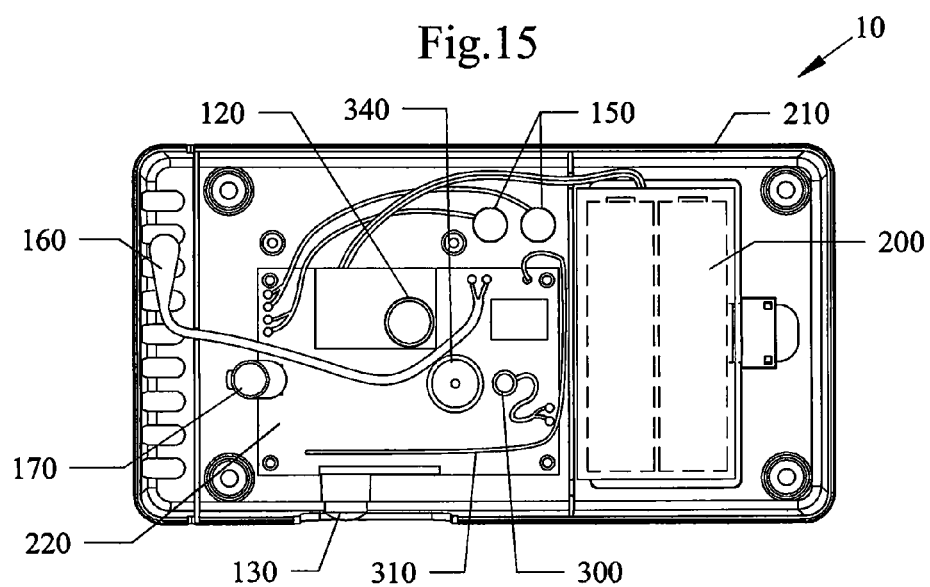

SOUND, TEMPERATURE AND MOTION ALARM FOR VEHICLE OCCUPANTS AND PETS

CROSS REFERENCE TO RELATED APPLICATION

This application is a Continuation In Part (CIP) of U.S. patent application Ser. No. 14/087,408 filed Nov. 22, 2013, which is a Continuation In Part (CIP) of U.S. patent application Ser. No. 13/757,050 filed Feb. 1, 2013, which is a Continuation In Part (CIP) of U.S. patent application Ser. No. 13/646,030 filed Oct. 5, 2012. The entire disclosure of each of the applications referenced in this paragraph are incorporated by reference.

FIELD OF INVENTION

This invention relates to vehicles and alarms, and in particular to systems, devices and methods of using sound detectors, motion detectors and temperature sensors inside vehicles for activating alarms to protect vehicle occupants that include babies, children, infirm, elderly and pets.

BACKGROUND AND PRIOR ART

The press has an increasing number of stories about occupants left in hot cars that suffer injuries from heat exhaustion to death. In the summer, there are often stories of children, such as babies that have been left in vehicles during hot days, and the babies have died from temperatures rising up to 130 degrees F. or more. These stories often revolve around a child being strapped to a car seat, and left for as little as a short period of time with the windows generally rolled up.

This problem also occurs to others that are also not very mobile such as the infirm and elderly. Additionally parked vehicles in parking lots can often be found with pets, such as dogs, and cats locked in the vehicles during hot days. Similarly, the pet is left at the mercy of dangerous temperatures that can also result in injuries up to death.

The children, infirm, elderly and pets will often have to rely on the stranger passing by to be saved from these heat related dangers. Often the passerby will not be able to save the vehicle occupants unless the vehicle is broken into, and sometimes it is too late at that stage.

Various devices have been proposed over the years as heat alarms for vehicle occupants. However, a large number of such devices require sensors/transducers that must attach directly to an existing rear seat in a vehicle or a child's car seat. See for example, U.S. Pat. No. 5,949,340 to Rossi; U.S. Pat. No. 6,812,844 to Burgess; U.S. Pat. No. 6,922,622 to Dulin et al.; U.S. Pat. No. 7,170,401 to Cole; U.S. Pat. No. 7,701,358 to White et al.; and U.S. Patent Application Publications: 2005/0225440 to Simmons et al.; 2005/0275260 to Patterson et al.; 2007/0096891 to Sheriff et al.; 2009/0277190 to Piette; and 2010/0090836 to Trummer However, these devices generally require having a child strapped to an existing car seat or to a separate child's car seat. Additionally, these devices generally require the use of sensors, such as a pressure transducer attached to the seat that will only be activated by the weight of the sitting child.

These devices are generally not easily moveable from vehicle to vehicle. Devices attached to the existing car seats must be securely mounted and cannot be easily removed. The child car seat sensor devices generally require a consumer to purchase a new child car seat since these sensors are usually built into the seat. Most families with children already have their own car seats, and would most likely not want to change out a functioning car seat.

Additionally, child car seat mounted devices will not work for other passengers in the vehicle that come into contact with dangerous heated temperatures. For example, an elderly person or older child sitting in a front passenger seat or another seat not having the car seat alarm would not be protected against the dangerous heat conditions. Additionally, pets are usually not strapped into child seats or to existing seats in a vehicle. A dog or cat would not be protected by devices that are attached to an existing car seat or removable child seat.

Still furthermore, the prior art does not describe, teach or suggest solutions to problems where the interior temperature inside of a vehicle can become too cold. For example, during winter months, babies, children, infirm, elderly and pets are also subject to unsafe and dangerous conditions when the temperature inside the vehicle becomes too cold, such as at cool temperatures down to freezing temperatures and the like. Hypothermia can be a deadly enemy that can kill unsuspecting babies, children, infirm, elderly and pets left inside of vehicles.

Additionally, power supplies for internal alarms generally require a battery to supply power to detectors. Continuously running a detector, such as a motion detector all the time, can run down the battery, and reducing the lifespan of the battery. This is further undesirable since the user has to constantly check and replace or recharge the battery which takes time and can result in system failures.

Thus, the need exists for solutions to the above problems with the prior art.

SUMMARY OF THE INVENTION

A primary objective of the present invention is to provide systems, devices and methods of using sound detectors, motion detectors and temperature sensors inside vehicles for activating alarms to protect vehicle occupants that include babies, children, infirm, elderly and pets from unsafe heat and cold temperatures.

A second objective of the invention is to provide systems, devices and methods of activating temperature heat and cold alarms inside vehicles that do not require car seats with built in sound detectors, motion detectors and temperature sensors.

A third objective of the invention is to provide systems, devices and methods of activating heat and cold temperature alarms inside vehicles based on sound detectors, motion detectors and temperature sensors, where the occupant can be located in any part of the vehicle, such as the front seat, back seat, rear compartments such as third row seats, and the like.

A fourth objective of the invention is to provide systems, devices and methods of activating heat and cold temperature alarms inside vehicles, based on sound detectors, motion detectors and temperature sensors, that do not require permanent installation and can be retrofitted into any type vehicle.

A fifth objective of the invention is to provide systems, devices and methods of activating heat and cold temperature alarms inside vehicles, based on sound detectors, motion detectors and temperature sensors, that can be relocated, transferable and portable from vehicle to vehicle.

A sixth objective of the invention is to provide systems, devices and methods of activating heat and cold temperature alarms inside vehicles, based on sound detectors, motion detectors and temperature sensors, that can be easily wired to an existing vehicle horn.

A seventh objective of the invention is to provide systems, devices and methods of activating heat and cold temperature alarms inside vehicles, based on sound detectors, motion detectors and temperature sensors, that can activate an external alarm that is audible both inside and outside of the vehicle without a user having to install separate wiring into a vehicle and without having to connect all components to a vehicle battery and horn.

An eighth objective of the invention is to provide systems, devices and methods of activating heat and cold temperature alarms inside vehicles, based on sound detectors, motion detectors and temperature sensors, that can activate both an internal alarm inside of a vehicle's passenger compartment as well as simultaneously activate an existing vehicle horn.

A ninth objective of the invention is to provide systems, devices and methods of activating heat and cold temperature alarms inside vehicles based on sound detectors, motion detectors and temperature sensors, that can be mountable to vehicle seat headrests.

A tenth objective of the invention is to provide systems, devices and methods of activating heat and cold temperature alarms inside vehicles, based on sound detectors, motion detectors and temperature sensors, wherein an alarm can possibly activate both a built-in alarm and also the vehicle horn.

An eleventh objective of the invention is to provide systems, devices and methods of activating an alarm for indicating unsafe cold and unsafe heat levels inside vehicles, based on sound detectors, motion detectors and temperature sensors, by sounding a Morse Code "SOS" signal of 3 short signals, 3 long signals and 3 short signals on a vehicle horn, and/or on another alarm.

A twelfth objective of the invention is to provide systems, devices and methods of activating an alarm for indicating unsafe cold and unsafe heat levels inside vehicles, that saves power and maximizes lifespan of battery power supplies by using only a microphone detector (sound sensor) to be in continuous on position, and leaving off other detectors such as motion detector(s) and temperature sensor(s), during a listen mode stage.

A version of the vehicle temperature alarm system can include a housing with a sound detector, motion detector and a heat and/or cold temperature sensor, adapted to be mounted to a headrest on a seat inside of a vehicle, an alarm inside of the vehicle, wherein a combination of occupant motion detected by the motion detector inside of the vehicle and a selected temperature detected by the temperature sensor above or below a selected threshold activates the alarm.

The sound detector and motion detector can include a strap for attaching the motion detector to the headrest, the strap having hook and loop fasteners for adjustably attaching the housing to different sized vehicle headrests.

The system can include a single housing for housing both the motion detector and the heat sensor.

The alarm can be built-in the unit itself and/or include an existing horn in the vehicle. An SOS alarm signal can be played on either or both the built in alarm or on the vehicle horn.

The motion detector can include a rear seat facing motion scanning detector, and a side facing motion scanning detector for scanning a front seat.

The motion detector can include a rear seat facing motion scanning detector, and a front seat facing motion scanning detector.

The system can include a wireless transmitter attached to the housing, and a wireless receiver attached to the vehicle horn, wherein the occupant motion detected by the motion detector the selected temperature detected by the temperature sensor above the selected threshold causes an alarm signal to be transmitted by the transmitter inside the vehicle to the receiver to activate the horn.

The system can include removable batteries inside the housing for providing power to both the motion detector and the temperature sensor, and power supply for the vehicle battery being an existing 12 volt battery inside the vehicle.

The power supply for the audible sounding alarm can also have a built-in battery supply. The vehicle horn can also be powered by the vehicle battery voltage.

The system can include a switch having different heat temperature settings for different occupants inside the vehicle, the different occupants being selected from children, infirm/elderly and pets.

A method of activating a temperature dependent alarm inside a vehicle, can include the steps of attaching a motion detector and heat sensor to a headrest above a seat inside of the vehicle, supplying power to the motion detector and the heat and/or cold temperature sensor, detecting both motion of a vehicle occupant and a selected temperature has been detected inside the vehicle, and activating an alarm when both the motion and the selected temperature have occurred over a selected time period.

The detecting step can include the steps of activating the motion detector only after the selected temperature has been reached by the heat and/or cold temperature sensor.

The method can include the step of providing both a rear seat facing motion detector and side seat facing motion detector on the headrest.

The method can include the step of providing both a rear seat facing motion detector and front seat facing motion detector on the headrest.

The attaching step can include the step of strapping both the motion detector and the temperature sensor to the headrest by a strap having hook and loop fasteners.

The method can include the step of providing an existing horn in the vehicle as the alarm.

The activating step can include the steps of remotely sending an alarm signal from a wireless transmitter adjacent to the motion detector and the heat and/or cold temperature sensor, and remotely receiving the alarm signal by a wireless receiver located adjacent to the vehicle horn.

The method can include the steps of powering the motion detector and the heat and/or cold temperature sensor from removable batteries, and powering the vehicle horn by an existing vehicle 12 volt battery.

The method can include the steps of selecting different temperature settings for the heat sensor based on different vehicle occupants, and selecting the different settings from the different occupants being selected from children, infirm/elderly and pets.

The method can include the step of playing an SOS alarm signal on the vehicle horn.

Further objects and advantages of this invention will be apparent from the following detailed description of the presently preferred embodiments which are illustrated schematically in the accompanying drawings.

BRIEF DESCRIPTION OF THE FIGURES

FIG. 6 is a top perspective view of motion detector with temperature sensor and cell phone module attached.

FIG. 7 is a bottom perspective view of the motion detector with temperature sensor and cell phone module of FIG. 6.

FIG. 8 is a top view of the motion detector with sliding temperature select switch allowing any temperature from 0 to 160 degrees F. to be selected as the alarm.

FIG. 8A is a top view of the motion detector with sliding temperature switch of FIG. 8 along arrow 8A.

FIG. 9 is a top perspective of the motion detector showing digital readout used for temperature selection allowing any temperature between 0 and 160 F to be selected for alarm.

FIG. 14 is a top view of the transmitter unit for the embodiment shown in FIG. 13.

FIG. 15 is a top view of the transmitter unit of FIG. 14 without cover.

DESCRIPTION OF THE PREFERRED EMBODIMENTS

Figure 1:
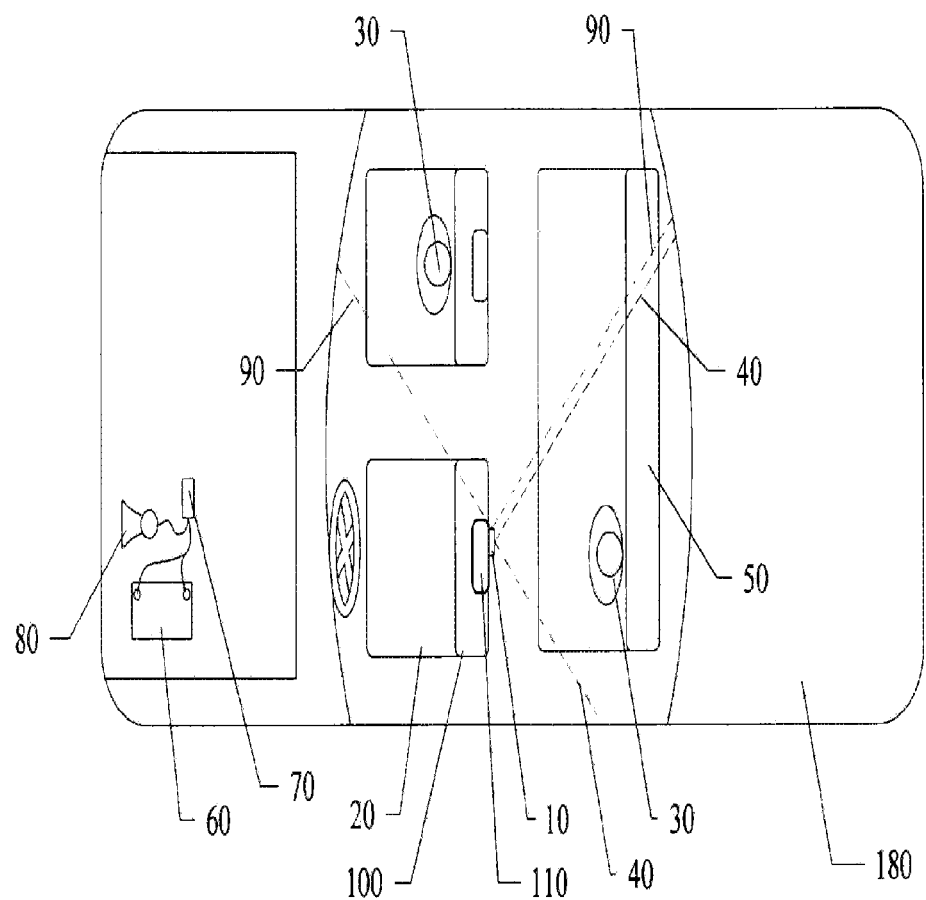
FIG. 1 is a top view of a car with an installed temperature alarm system showing monitored subjects and unit having a temperature sensor with motion detector range of view.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of the components in the invention will now be described.

10 Motion Detector and Temperature (Heat and/or Cold) Sensor Unit.
15. Transmitter unit
20 Front seat.
30 Monitored subject. Baby, Child, Adult, Senior, Infirm or pet.
40 Rear motion sensor viewing range.
50 Back seat.
60 12 volt car battery.
70 Receiver Unit.
80 Car horn.
90 Side motion sensor viewing range.
100 Front seat backrest.
110 Front seat headrest.
120 Rear motion sensor.
130 Side motion sensor.
140 VELCRO® strap to mount Sentry Unit to headrest or backrest.
150 Indicator LED.
160 Temperature (Heat &/or Cold) sensor and vents.
170 Reset button.
180 Car.
190 Temperature select switch.
200 Internal battery
210 bottom of unit case
220 Printed circuit board
230 Cell phone module.
240 Cable to connect sentry to cell phone module.
250 Alarm temperature sliding adjustment switch allows 0 to 160 degree alarm setting.
260 Alarm temperature digital adjustment readout allows 0 to 160 degree alarm setting.
270 Down adjust button for setting digital readout.
280 Up adjust button for setting digital readout.
290 "Set" button to lock in digital readout temperature setting.
300 Microphone
310 Transmitter antenna
320 Top transmitter case
330 Motion sensor window
340 Buzzer
400 sound detector, motion detector, temperature sensor flowchart Motion Detector with Heat Sensor Embodiment FIG. 1 is a top view of a car 180 with an installed heat alarm system showing monitored subjects 30 and unit 10 having motion detector range of view and heat sensor.

Figure 2:
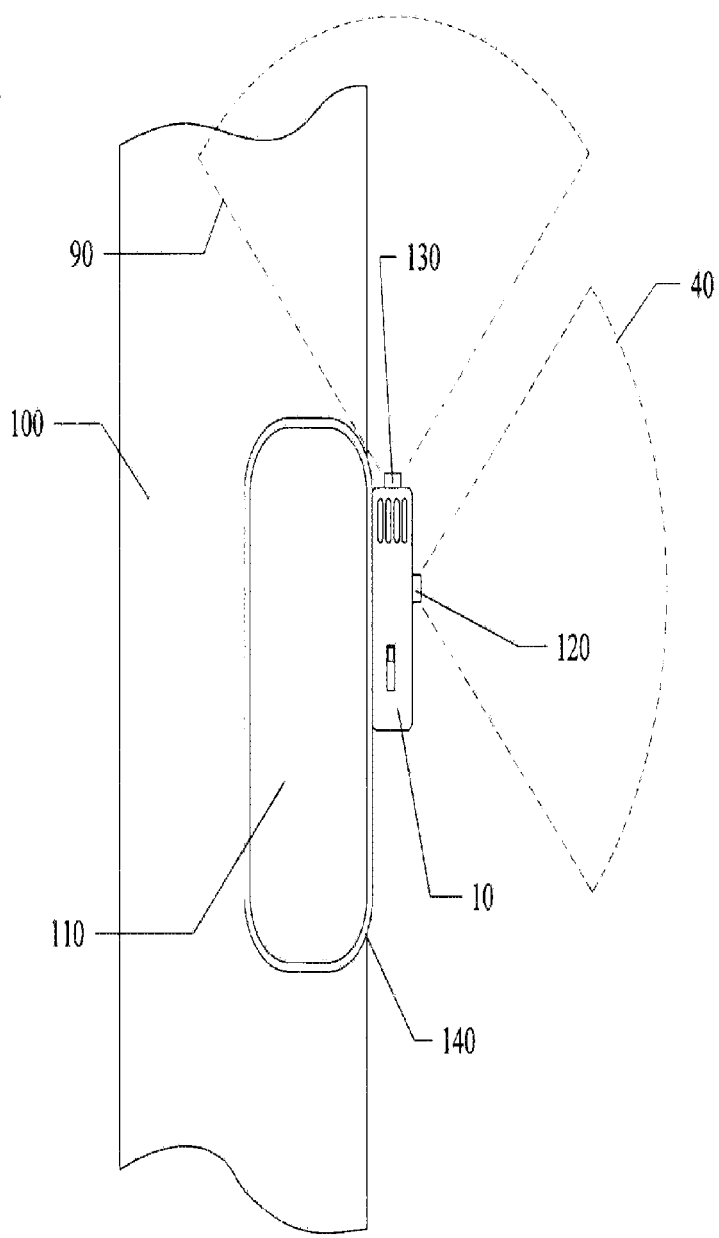
FIG. 2 is an enlarged top view of the headrest mounted motion detector and temperature sensor unit of FIG. 1.

FIG. 2 is an enlarged top view of the headrest 110 mounted motion detector and heat sensor unit 10 of FIG. 1.

Figure 3:
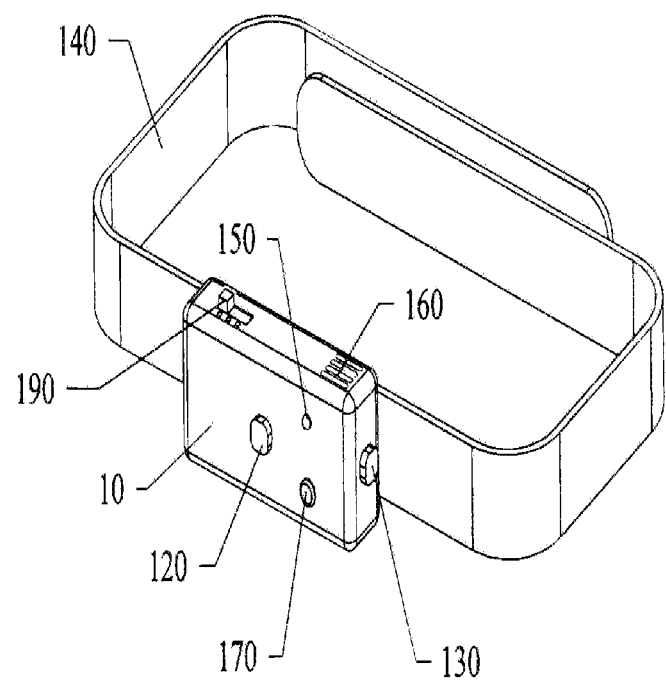
FIG. 3 is a perspective unmounted view of the motion detector and temperature sensor unit of FIG. 2.

FIG. 3 is a perspective unmounted view of the motion detector and heat sensor unit of FIG. 2.

Referring to FIGS. 1-3 the novel motion detector and heat sensor unit 10 can be mounted to a front seat headrest 110 above a front seat backrest 100 inside of a vehicle 180. A strap 140 can have hook and loop fasteners (VELCRO®) that allows the unit 10 to be adjustable attached about different sized vehicle headrests 110. The headrest 110 can be located on a front seat 20 or rear (back) seat 50 or third seat (not shown) inside of a vehicle 180.

The unit 10 can include a rear motion sensor 120 and/or side motion sensor 130, that each can have rear viewing range 40 and side viewing range 90, each viewing range being up to approximately 90 to approximately 180 degrees. The motion sensors 120, 130 can detect both front seat and rear seat occupants 30.

The unit 10 can also include a combination of a rear seat facing motion sensor 120 and a front seat facing motion sensor 130. The unit 10 can also include three sensors for detecting rear seats, sides, and front seats inside the vehicle.

Each of the monitored subjects (occupants) 30 can include babies, children, infirm, elderly and pets, located inside of the vehicle. The unit can include preprogrammed computer with the pre-selected temperature threshold selections, and timer that will be described in more detail below.

Figure 5:
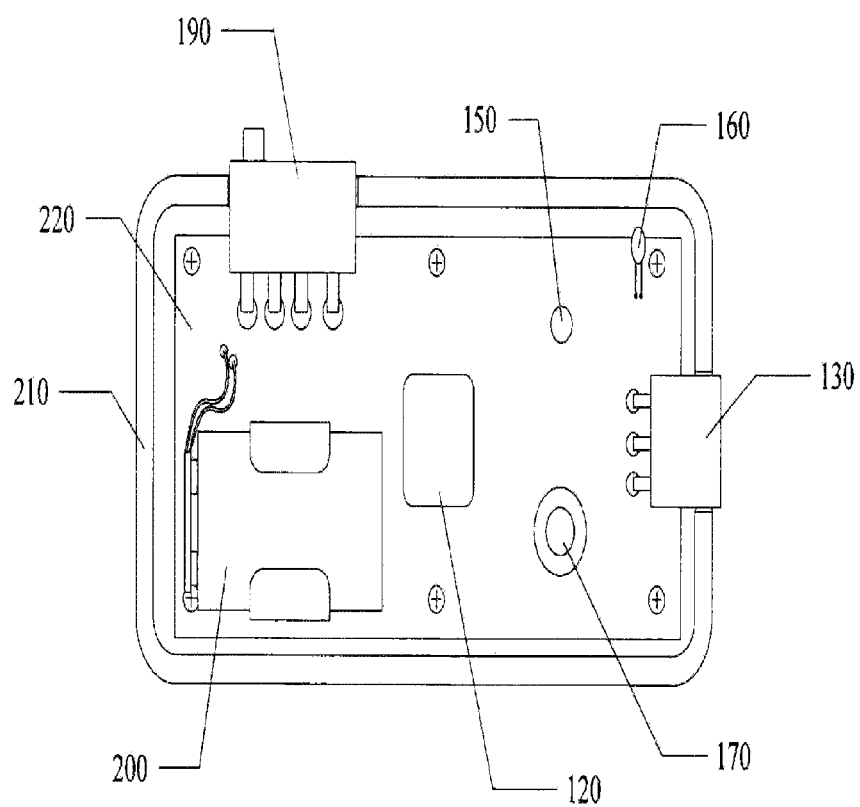
FIG. 5 shows the system components inside of the unit.

Also, inside of the unit 10 can be a temperature sensor (such as a heat or cold temperature sensor) 160 protected by vents on a side of the unit 10. The unit can be battery powered by batteries inside of the unit 10, such as but not limited to 9 volt batteries, A, AA and/or AAA batteries. For example, the unit 10 can have a single 9 volt battery (similar to those used in smoke detectors). FIG. 5 referenced below has an example of inside components.

The power supply for the audible sounding alarm can also have a built-in battery supply. The vehicle horn can also be powered by the vehicle battery voltage.

A reset switch 170 can be pressed or switched on to activate the unit 10, a light 150, such as an LED (light emitting diode) can turn on when the reset button 170 is first pressed, and the light 150 turned off to indicate the unit is powered off when the reset button 170 is pressed again.

Light 150 can be a single color light or multiple color lights, such as having both green and red colors.

Additionally, the reset button 170 can have a function to reset the unit 10 after the unit 10 has activated alarms.

Additionally, the indicator light 150 can have a low setting or off setting when button 170 is pressed which indicates low or dead battery inside the unit 10. The indicator light 150 can also flash different colors (such as red) for example, every 6 seconds when it is time to change the unit batteries. The unit can still function for a short time when the flashing has been reached. The batteries are intended to allow the unit to be operational for at least one year.

The indicator light 150 can also be used as a motion detector(s) (120, 130) test light. A double press of the reset 170 can turn on the motion detector(s) 120, 130. The indicator light 150 can turn red for a time period (for example 20 seconds) while the detector(s) 120, 130 are warming up. After the warming up the indicator 150 can turn green which indicates a test period (for example 1 minute test period). Any motion detected after this 1 minute test period can cause the indicator light 150 to flash red and green verifying the function of the motion detector(s) 120, 130. This test function can time out after 1 minute in order to preserve battery power.

Additionally, the reset button 170 can be used to reset the motion detector(s) 120, 130 and reset the unit 10 after an alarm has been sounded or during an alarm sounding condition.

Additionally, the light 150 can blink or be multiple lights, such as multiple LEDS to function as a visual alarm when the motion detector and sensor unit becomes activated.

Still furthermore, the motion detector and sensor unit can include an extra audio alarm, such as but not limited to buzzer, another horn, and the like. For example, the 9 volt battery can activate a smoke alarm type buzzer as an internal alarm inside the vehicle.

As such, the invention can have a dual powered alarm that activates both a vehicle horn under the vehicle hood, as well as a buzzer type alarm on the unit 10 inside the vehicle passenger compartment.

Additional switches on the unit 10 can include a temperature select switch 190 having different positions. For example, temperature select switch can have a first position for activating the alarm (to be discussed) for babies and children for temperatures of between approximately 100 F to 105 F, a second select position for temperatures between approximately 106 F to 109 F, and a third select position for temperatures at approximately 110 F and higher.

Motion detector and heat sensor unit 10 can have the ability send a wireless signal from a transmitter unit 15 to a remotely located receiver unit 70 that can be located under the hood of the vehicle 180. The receiver unit 70 can be wired to both the existing vehicle 12 volt car battery 60 that is wired to the existing vehicle horn 80.

Although the unit 10 is described as being battery powered, the unit 10 can be hardwired and connected to the existing vehicle power, such as to a cigarette lighter adapter, and the like.

The motion detector and heat sensor unit 10 can be set in a "power save" mode by default and the motion detectors (120, 130) are not scanning for motion, until ambient temperature inside the vehicle 180 reaches a selected temperature set threshold. For example, a first position of the switch 190 would keep the motion detectors 120, 130 off until a first temperature of approximately 100 F to approximately 105 F is reached. When the selected temperature threshold is reached the unit 10 the motion detectors 120, 130 turn on and start scanning.

In operation, the unit 10 can be programmed to send a signal to sound the vehicle horn 80 after a selected time period has been reached. For example, the unit 10 can be programmed to sound the vehicle horn 80 after approximately 5 minutes when the inside vehicle temperature has reached at least approximately 100 degrees and motion of an occupant has been detected inside the vehicle 180.

With the novel invention, the horn can be activated for a continuous horn signal or intermittent horn signal. The invention can also be programmed to have the horn emit an emergency signal such as the international distress SOS signal when activated in Morse Code. The international SOS being three dits (short pulse signals) followed by three dahs (three longer signals), followed by three dits (short pulse signals).

Different scenarios can include the vehicle is already hot, or the vehicle was initially cool, but has been closed up and abandoned with an occupant (baby, child, infirm, elderly person) inside.

Scenario One: Vehicle Already Hot Mode

In this example, the vehicle has been sitting in the sun with windows rolled up. The temperature inside is already above approximately 105 degrees, and the motion detectors 120, 130 is now scanning for motion. When an occupant, such as a baby or child is placed in a child seat, or on an existing seat, the motion detectors 120, 130 on unit 10 detects motion and samples temperature inside the vehicle. Once the temperature is above the selected set point (here for example, approximately 105 F), a timer inside the unit 10, can start counting and the internal vehicle temperatures is monitored for approximately 5 minutes. If after 5 minutes, the temperature inside the vehicle has not dropped below a set point (such as for example, below 100 F), an alarm signal be transmitted by transmitter 115 to the receiver 70 under the hood to activate the vehicle horn 80 to run an SOS sequence, and the like.

The invention can work under the condition that temperature inside the vehicle will quickly and rapidly drop below a set point when the vehicle is ventilated, such as when the vehicle is put in motion with windows opened and/or the air conditioning system in the vehicle is turned on.

This scenario can include a set condition that the alarm will instantly sound off without delay if a higher preselected temperature of for example, 110 F and motion inside the vehicle are simultaneously detected.

Scenario Two: Vehicle Initially Cool, but has been Closed Up and Abandoned with Occupant Inside In this scenario, the unit 10 is in a sleep type mode. If the temperature inside the vehicle raises above a set point (for example above approximately 105 F), the unit 10 wakes up and sensors 120, 130 begin scanning for motion. If an occupant is then detected, the unit 10 starts the timer, which can be programmed to run for approximately 5 minutes. If after 5 minutes the interior temperature is still above the set point and motion is still detected, the unit 10 would transmit a signal to the receiver unit 70, which would activate vehicle horn 80 to play a distress code, such as SOS, and the like.

This scenario can also include a set condition, that the alarm will instantly sound off without delay if a higher preselected temperature of for example, 110 F and motion inside the vehicle are simultaneously detected.

Figure 4:
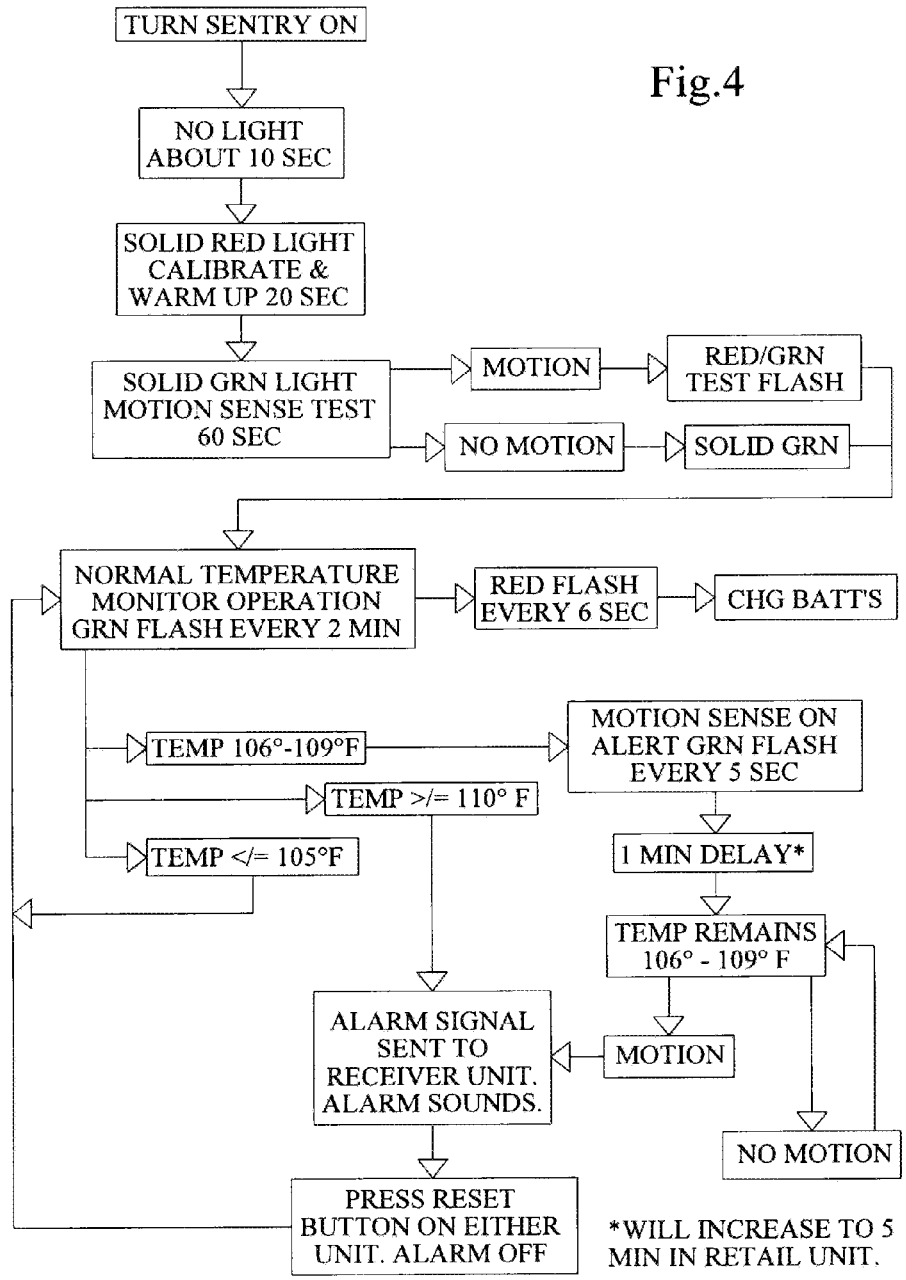
FIG. 4 is a flowchart running through the operational steps of the installed heat alarm system with motion detector and temperature sensor unit.

FIG. 4 is a flowchart running through the operational steps of the installed heat alarm system with motion detector and heat sensor unit 10.

FIG. 5 shows the system components inside of the unit 10. The bottom case 210 of the unit 10 can include rear motion sensor 120, side motion sensor 130, indicator LED 150, heat sensor and vents 160, reset button 170. 190 Temperature select switch 190, internal battery, 200 (such as but not limited to replaceable 9 volt or A or AA or AAA batteries), and printed circuit board 220.

Although the described embodiments has the novel unit 10 attached to a head rest inside of a vehicle. The unit can also be attached to other supports inside of a vehicle.

Additionally, the novel unit with temperature sensing and monitoring can be attached directly to an individual inside of the vehicle, such as but not limited to be attached to a waist of an infant and/or child, and/or about an animal inside of the vehicle such as formed as a smaller component attached similar to a collar on a dog or cat, etc.

With these other applications, the unit can be used with only the temperature monitor and built-in alarm, so that the temperature of the infant and/or child, and/or pet is monitored to make sure that dangerous heat conditions are detected and the built-in unit alarm is sounded. Additionally, these applications can also be used with both the built-in alarm and the vehicle alarm.

Still furthermore, the novel system can be used to activate other alarms, such as in a phone app where a smart phone, such as but not limited to an IPHONE®, and the like, is sent the alarm signal so that a parent and/or other third party is notified of the dangerous heat conditions.

Additionally, the unit can have other indicators thereon that give out visual readings of the actual temperature itself so that others can monitor the temperature. Additionally, the actual temperature reading being monitored by the unit can be sent to remote locations, for example through the web and/or by phone apps to smart phones and/or to third party monitoring locations as desired.

Although the above embodiments describe the temperature alarms being set to temperatures for unsafe warm and hot conditions, the invention can be used to activate alarms when temperatures reach unsafe cold temperatures, and the like. Additionally, the alarms can be set with both hot and cold temperature settings that activate the alarms.

Motion Detector with Temperature Select Switches for Heat and/or Cool Temperature Settings FIG. 6 is a top perspective view of motion detector 10 with temperature sensor 160 and cell phone module 230 attached. FIG. 7 is a bottom perspective view of the motion detector 10 with temperature sensor 160 and cell phone module 230 of FIG. 6.

Referring to FIGS. 6-7, the motion detector 10 with temperature sensor (sensing either or both selected heat and/or cold temperature settings) 160 can activate the cell phone module 230 by cable line 240. When a selected temperature setting has been sensed, the cell phone module 230 can send remote signals to portable phones, such as cell phones, smart phones and the like, on a third party to sound a alarm (either sound, vibration or lights) on the remote phone that a selected temperature setting inside the vehicle has been reached.

FIG. 8 is a top view of the motion detector 10 with sliding temperature select switch 250 allowing any temperature from approximately 0 to approximately 160 degrees F. to be selected as the alarm. FIG. 8A is a top view of the motion detector 10 with sliding temperature switch 250 of FIG. 8 along arrow 8A.

Referring to FIGS. 8-8A, the sliding switch 250-allows the user to easily adjust temperature settings to any cold and heat temperature settings. Although one switch is used, the sliding switch can have two sliders, one for cold temperatures and one for warm/hot temperatures. The temperatures can range from approximately 0F to approximately 160 F. The term approximately and encompass +/− ten degrees.

FIG. 9 is a top perspective of the motion detector 10 showing digital readout 260 used for temperature selection allowing any temperature between approximately 0 and approximately 160 F to be selected for alarm. Button 270 can be a down adjust button for setting digital readout selected temperature. Button 280 can be an up adjustment button for setting a digital readout selected temperature. The user can put in a low temperature such as but not limited to approximately 50 F and/or a high temperature setting such as but not limited to approximately 100 F. Set button 290 can be pressed to lock in the digital readout temperature setting or settings.

Figure 10:
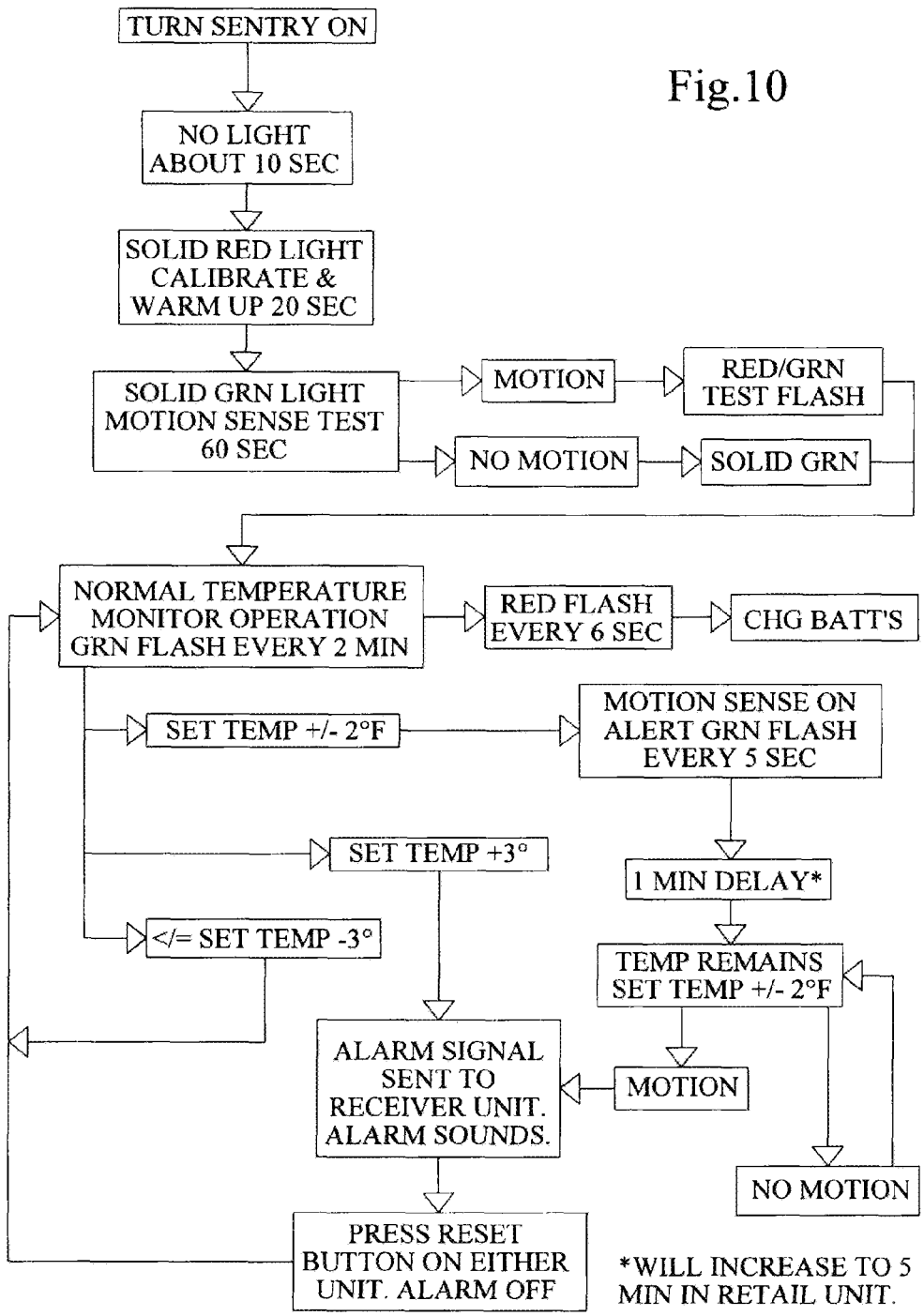
FIG. 10 is a flow chart for temperature select options for the motion detector and temperature sensor.

FIG. 10 is a flow chart for temperature select options for the motion detector and temperature sensor, which can be a modified version of the flowchart shown in FIG. 4.

In the previous embodiment hot temperature settings were described, that can include approximately 100 F, approximately 110 F and approximately 140 F. The invention can also activate the alarms at low temperature settings, such as but not limited to approximately 50 F. Hypothermia can develop if environmental temperatures inside of a vehicle drop to approximately 50 F and lower. As such, the alarm can sound after a certain delay time has occurred. For example, the invention can allow for occupants to go into a cold vehicle, and the alarm can become activated after a period of approximately 10 minutes if the interior vehicle temperature has not risen above approximately 50 F.

The term approximately can allow for +/−10 degrees.

Figure 11:
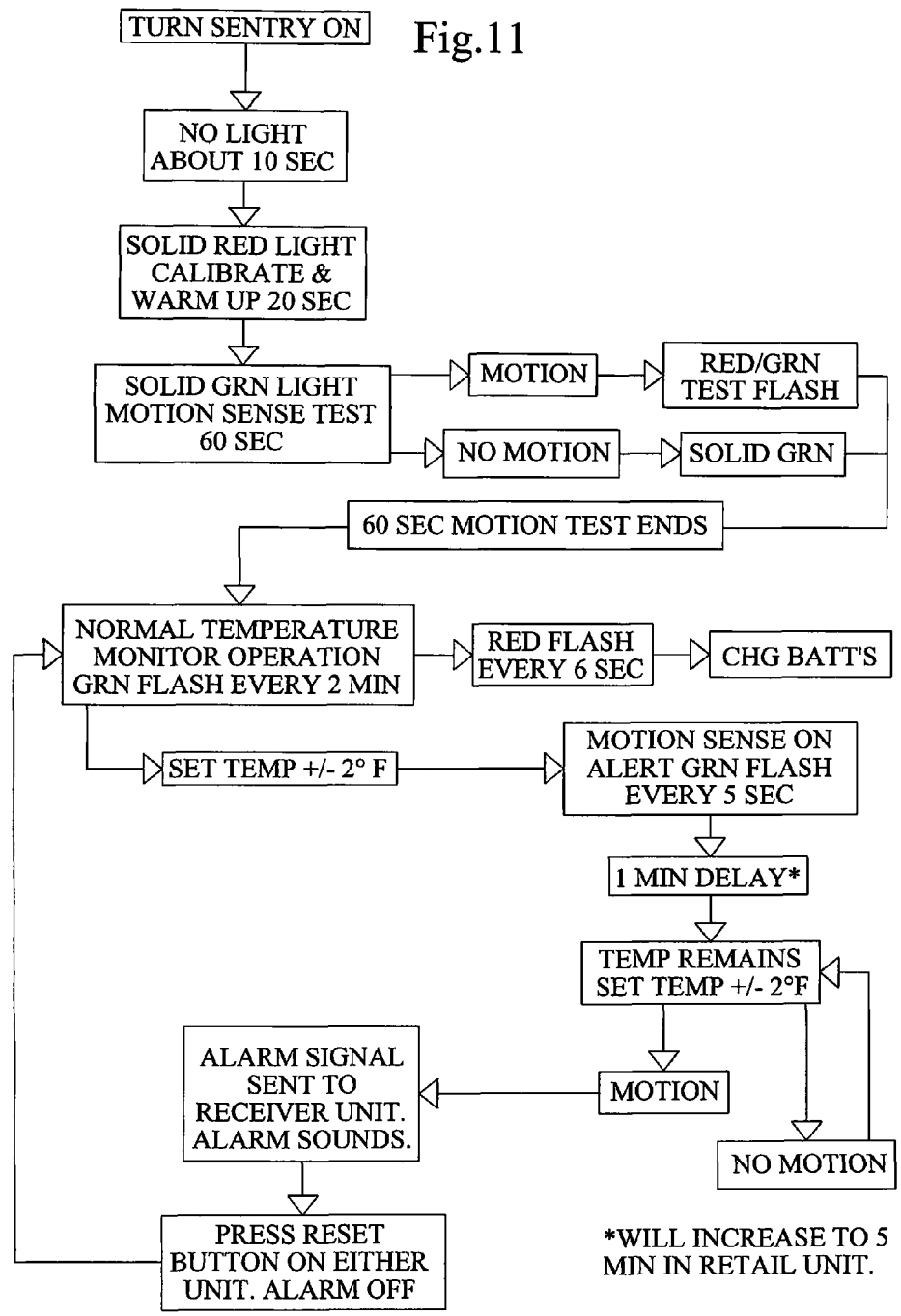
FIG. 11 is a modified flow chart temperature select options.

FIG. 11 is a modified flow chart of FIG. 10 showing the temperature select options, which covers the sensed temperature sufficient to turn on the motion sensor and/or to set the alarm. In FIG. 10, it was +/−2 degrees of the set point temperature. In FIG. 11, it is the set point temperature or greater. Additionally, the embodiment in FIG. 11 removes the features in FIG. 10 that would bypass the timer if the temperature was 3 degrees (or more) over the set point.

Figure 12:
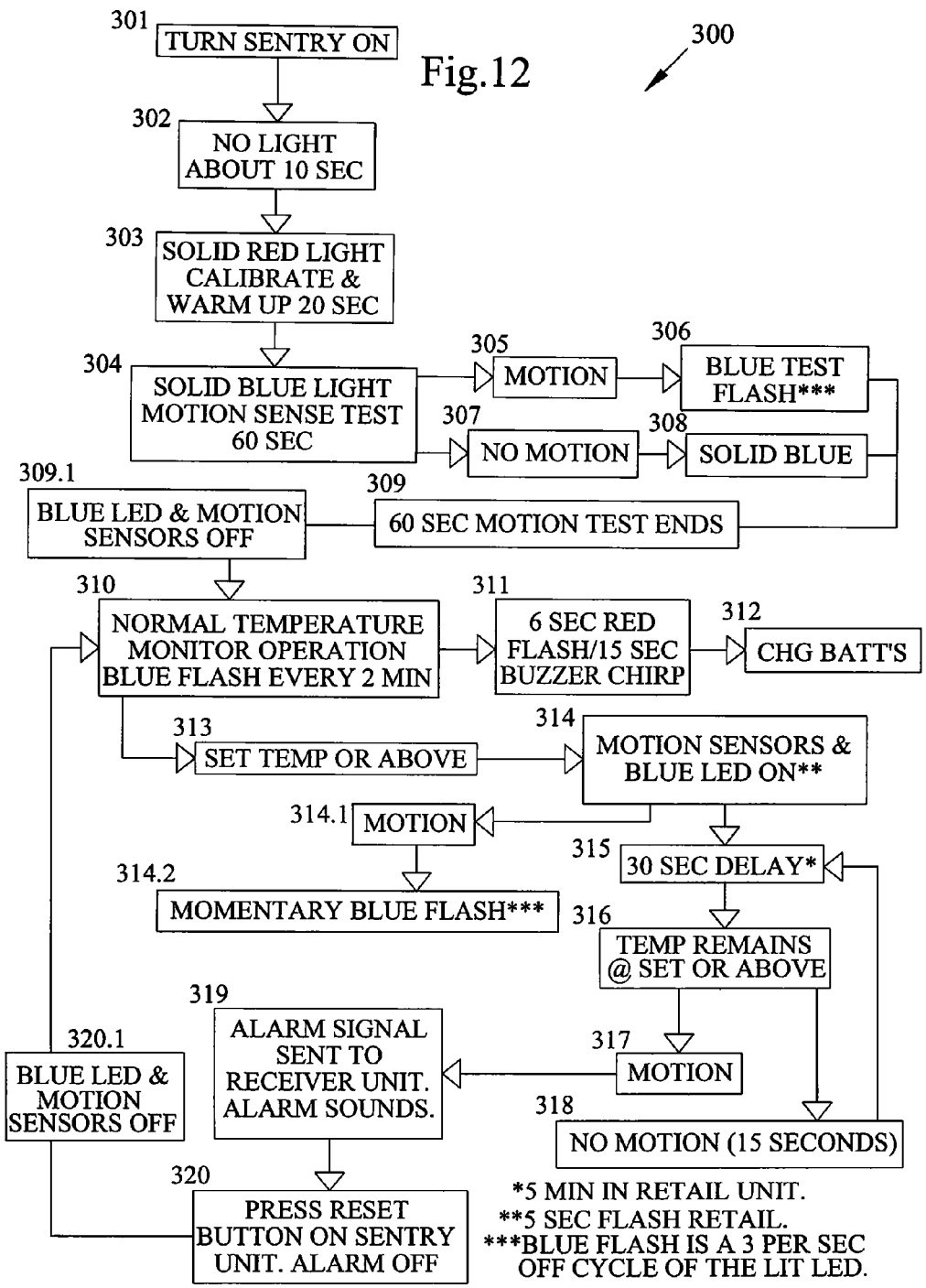
FIG. 12 is a modified flow chart of FIGS. 4, 10 and 11.

FIG. 12 is a modified flow chart of FIGS. 4, 10 and 11. In box 319, alarm signals are sent to the receiver. In addition, alarm sounds, text and/or voice messages can be directly sent to smart phones and cellular type phones, and other types of portable electronic devices, and the like.

Additionally, the embodiment in FIG. 12 turns the monitor (sentry) on 301, no light 302 and solid red light to calibrate and warm up 303. Next, the invention uses blue lights for motion sense test 304, 305, 306, 307, 308, 309, 309.1, 310. Red light and/or chirp 311 to indicate batteries need to be charged or changed 312. Set temperature or above 313, motion sensors and blue LED on 314. Motion 314.1 goes to a momentary blue flash 314.2. 30 Sec delay 315 goes to temperature remains at set or above 316. Motion 317 goes to alarm signal 319 sent to receiver and/or alarm sounds, and/or text and/or voice message alert is sent to smart phones, cell phones and other electronic devices. Press reset button 320 shuts off alarm followed by feedback loop to blue LED and motions sensors off 320.1 and to normal temperature monitor operation 310. No motion (for example, 15 seconds) 318 from temperature remains at set or above 316 goes back to 30 second delay 315 and back to temperature remains at set or above 316.

In FIG. 11, the invention uses software for indicating low battery by indicating with red flashes and/or buzzer sounds and/or chirp sounds 311, 312. A hardware version can use circuitry found in smoke detectors used in homes where the smoke detector generates chirp sounds to indicate batteries needing to be replaced and/or charged. See for Example, U.S. Pat. No. 7,626,678 to Chapman; U.S. Pat. No. 5,686,896 to Berman and U.S. Pat. No. 5,969,600 to Tanguay which are each incorporated by reference.

Sound Detector, Motion Detector and Temperature Sensor

Figure 13:
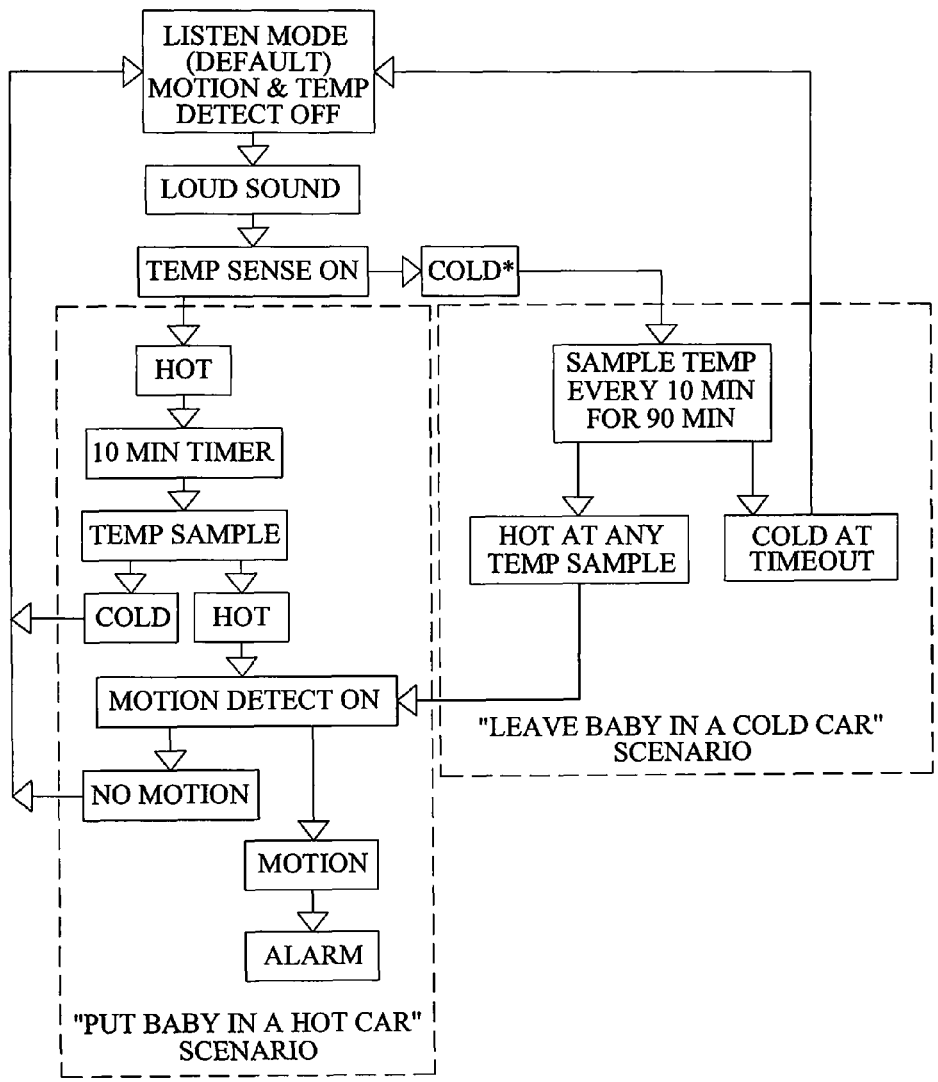
FIG. 13 is a flowchart of another embodiment of a sound detector, motion detector and temperature sensor version.

FIG. 13 is a flowchart of another embodiment of a sound detector, motion detector and temperature sensor version of the invention that modifies the previous embodiments.

FIG. 14 is a top view of the transmitter unit 10 for the embodiment shown in FIG. 13. FIG. 15 is a top view of the transmitter unit 10 of FIG. 14 without cover.

Referring to FIGS. 14-15, the unit 10 can include side motion sensor 130, indicator LED(s) 150, temperature heat sensor 160, reset button 170, internal battery 200 bottom of unit casing 210, printed circuit board 220, which are components described in detail in the previous embodiments above. Here, unit 10 can further include a microphone 300, such as but not limited to a CUI INC part # CME-1538-100LB, transmitter antenna 310, top transmitter case 320, motion sensor window 330 such as a translucent material, and buzzer 340. The buzzer 340 can be another alarm besides the vehicle horn, previously described.

Transmitter inside the unit communicates to receiver underneath the hood of the vehicle by RF (radio frequency) and each uses respective antenna(s) 310 to send and receive RF signals.

The flowchart 400 will be described in reference to FIGS. 13-15. The reset button 170 can be activated to put the embodiment 10 in a listen mode (default) where the microphone 300 is only turned on, and the motion detector 130 and temperature sensor 160 are both turned off. A loud sound such as car door slamming sound picked up by the microphone, and the sound level decibels can be programmed to respond to a loud sound such as a door closing. Other sounds such as but not limited to a child, baby, pet making some sounds can further be picked up by the microphone. This picked up sound then automatically turns the temperature sensor 160 on.

Temperature sensor 160 then checks for a selected hot temperature (such as but not limited to over approximately 100 F) or for a selected cold temperature (such as but not limited to below approximately 100 F). The selected temperature settings can be pre-programmed and/or selected by the user.

If a selected hot temperature is sensed, the unit then goes through a timer (such as approximate 10 minute timer), and then the temperature sensor 160 samples air again, if a selected cold temperature setting is sensed, the unit 10 goes back to the listen mode (default step) to start again. If the selected hot temperature setting is sensed, the unit 10 activates the motion detector 130. If no motion inside the vehicle (such as from a child or pet) is detected, the unit 10 goes back to the listen mode (default step) to start again. If motion is detected inside the vehicle (such as from a child or pet), an alarm, such as but not limited to an internal and/or external alarm, such as a buzzer 340 to go off alerting others to that an occupant (such as a child or pet) is inside the vehicle. The alarm can also be an external alarm, such as the car horn, and the like previously described.

The flowchart 400 also allows for another scenario starting from the listen mode (default) step, with the motion detector and temperature sensor being off. A loud noise (such as car door closing) will turn on the temperature sensor 160. If a selected cold temperature setting (below approximately 100 F) is detected, the temperature sensor 160 can then sample temperatures every 10 minutes for 90 minutes. If the selected hot temperature setting is sensed, the motion detector 130 is turned on to determine if either no motion or motion is detected to follow paths previously described. If the sample temperature sensing every 10 minutes is the selected cold temperature setting, the unit goes back to the listen mode (default) step to start over.

Also, after 90 minutes, the unit 10 can go back to start over at the listen mode (default) stage and start the process over again. The flowchart can be integrated into a chip and/or computer and the like.

The embodiment in FIGS. 13-15 allows for a longer lifespan of the unit 10 by only having the microphone (sound sensor) to be always on, and saves the life of battery 200 by keeping the motion detector 130 and temperature sensor 130 in off modes, which conserves life of the battery 200.

Using only the listen mode, can expand battery life of a batteries, up to ten (10) times or more, compared to having the motion detector, and temperature sensor, and microphone continuously in an on mode. The amount of battery life can depend on the environment. For example, a vehicle parked in a noisey environments, such as a construction site or high traffic site, can activate the microphone detector and system more frequently effecting, such as shortening battery life span.

Additionally other features of the embodiments can be used with each embodiment. For example, the low battery alarm indicator (audio alarm and/or light alarm) can be activated when the battery life reaches a selected level.

The microphone can further listen not just for motion noise, such as car doors, it can also sense audible distress from occupants, such as babies, children and pets to activate the system.

The embodiment in FIGS. 13-14 can also be used to activate alarms when unsafe cold temperatures have been reached.

While the system is described as having the sound detector continuously running in the default mode and the motion detector and temperature sensor being turned off, the invention can also have the sound detector de-activated while the motion detector and the temperature sensor are both working to further maximize and save battery life.

The invention can also be part of an onboard computer system, where temperature settings, alarms and alarm notification features are programmed into the onboard computer or factory pre-programmed or dealer installed. For example, an onboard thermometer inside the vehicle can be set to temperatures (by the user or pre-programmed) that can also activate alarms, and/or provide remote notification to portable remote phones or remote computers, and the like, as described with the above embodiments.

This embodiment can function as automatic babysitter inside the vehicle to be able to see (with motion detector(s)), feel (with the temperature sensor(s), and listen (with the microphone(s)).

The invention can additionally have second or more backup monitor and alarm systems. For example, a second alarm can sound off and/or send messages, and the like, when temperatures reach selected amounts of approximately 120 degrees or more.

Additionally, loud digital voices can be generated by speakers directly around the vehicle to get immediate attention of those in the vicinity of the vehicle. For example, a recorded voice such as but not limited to "HOT BABY IN CAR" can be generated from the vehicle.

Additionally, the system can have no on and off switches that will allow it to be accidentally deactivated.

The invention can also be part of a downloadable smart phone App. that can be used with the vehicle computer system and the like. The alarms and monitors can be connected to one's smart phone. Additionally, other detector(s), such as a camera(s) can be mounted inside the vehicle to add another level of detection which can send images of the child, baby, and pet to remote locations, such as to one's smart phone, and the like. Images can give recipients immediate indications of distress of the occupants.

Optionally, a test circuit can be included which allows the user to test the sound detector (microphone), the motion detector and the temperature sensor and battery to make sure each is fully operational so that the user check the unit periodically to verify the unit works. Each of the sensing devices, can optionally have a switch, such as a button to test each one of the sensing devices individually.

Additionally, the unit can be built with over-ride features so that if one of the detectors (sound, motion, temperature) fail or do not work, the other detectors, will still operate in order activate alarms to indicate occupants in the vehicle are under distress conditions.

Still furthermore, the unit can have a periodic self test feature, where the unit will test itself periodically, and if any one of the detectors or battery fail individually or in sequence the unit would send out an alarm, such as the low battery chirp alarm to indicate to the user the unit is not fully operational.

The invention can also have a feature of the alarm signal going off can activate a switch such as a solenoid attached to the vehicle child seat, which would automatically detach the seat buckle, to allow toddlers and above the capability of self preservation.

Additionally, the activation can include automatically opening the vehicle door, such as but not limited to one or more side doors and/or the rear hatchback door opening up. A door automatically opening would give bystanders further attention to the vehicle having an occupant in distress.

For babies and toddlers in rear facing child seats, the opening of the rear hatchback door can both automatically signal those in vicinity of the occupant and immediately help lower vehicle interior temperature.

The unit can further activate the electric windows of the vehicle to immediately open extending and potentially saving the distressed occupants life to immediately lower the interior temperature inside of the vehicle.

The opening of doors and/or windows also allows for the vehicle occupant such as babies, toddlers and children that are strapped in seats the ability to signal by crying, yelling to those in vicinity of their distress.

The unit can energize the vehicle computer and/or controls by hardwire or RF (radio frequency) using the antennas, and/or the remote control technology used on vehicle keys, to automatically lower windows, open doors, and the like, when the alarm is being activated.

Still furthermore, the unit can automatically turn on air conditioning under dangerous heat conditions, or turn on heat under extreme cold conditions.

The units can be factory installed by automobile manufacturers, and/or dealerships. Additionally, the units can be purchased over the counter and installed by end users, and/or their mechanics.

Although the embodiments reference the user being able to select temperature settings, the temperature settings can also be pre-sec by the factory or installer. The temperature settings can be set to heat temperature setting(s) or cold temperature setting(s) or to both heat and cold temperature settings.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A vehicle interior temperature alarm system, comprising:
   a sound detector, and a motion detector and a temperature sensor for being mounted inside a vehicle;
   a battery power supply for supplying power to the sound detector, the motion detector and the temperature sensor; and
   an alarm attached to the sound detector, the motion detector and the temperature sensor;
   a listen mode, wherein the sound detector is turned on to be powered by the battery, and both the motion detector and the temperature sensor are turned off from the battery; and
   a temperature sensor power mode, wherein the temperature sensor is turned on when the sound detector picks up a sound inside of the vehicle; and
   a motion detector power on mode, wherein the motion detector is turned on when a selected temperature is detected by the temperature sensor, and wherein the alarm is activated when a selected motion level is detected inside of the vehicle by the motion detector.

2. The vehicle interior temperature alarm system of claim 1, further comprising:
   a single housing for the sound detector, the motion detector and the temperature sensor; and
   a mount for mounting the housing to a headrest on a seat inside of a vehicle.

3. The vehicle interior temperature alarm system of claim 1, further comprising:
   an SOS alarm signal played on a vehicle horn.

4. The vehicle interior temperature alarm system of claim 1, wherein the motion detector includes:
   a rear seat facing motion scanning detector; and
   a side facing motion scanning detector for scanning a front seat.

5. The vehicle interior temperature alarm system of claim 1, wherein the motion detector includes:
   a rear seat facing motion scanning detector; and
   a front seat facing motion scanning detector.

6. The vehicle interior temperature alarm system of claim 1, further comprising:
   a wireless transmitter attached to the alarm system; and
   a wireless receiver attached to a vehicle horn, wherein an alarm signal is transmitted by the transmitter inside the vehicle to the receiver to activates the horn.

7. The vehicle interior temperature alarm system of claim 1, wherein the battery power supply includes:
   removable batteries for providing power to the sound detector, the motion detector and the temperature sensor.

8. The vehicle interior temperature alarm system of claim 1, further comprising:
   a switch having different temperature settings between approximately 1 to approximately 160 F for different occupants inside the vehicle, the different occupants being selected from children, infirm/elderly and pets.

9. The vehicle interior temperature alarm system of claim 8, wherein the switch includes at least three fixed settings.

10. The vehicle interior temperature alarm system of claim 1, further comprising:
    controls for automatically opening a vehicle window when the detected temperature setting is reached.

11. The vehicle interior temperature alarm system of claim 1, further comprising:
    controls for automatically opening a vehicle door when the detected temperature setting is reached.

12. A method of activating a temperature dependent alarm inside a vehicle, comprising the steps of:
    mounting a sound detector and a motion detector and a temperature sensor inside a vehicle;
    supplying power from a battery supply to the sound detector and the motion detector and the temperature sensor;

detecting sound from the sound detector, and detecting a motion from the motion detector and sensing a temperature from the temperature sensor; and activating an alarm, when the detected sound, the detected motion and sensed temperature reach selected levels;

continuously listening for a selected sound level by the sound detector, when the motion detector and the temperature sensor are turned off from the power from the battery supply;

supplying the power from the battery to the temperature sensor when the selected sound level by the sound detected is reached;

supplying the power from the battery to the motion detector when a selected temperature level sensed by the temperature sensor is reached; and activating the alarm when a selected motion level detected by the motion detector is reached.

13. The method of claim 12, further comprising the step of:
attaching the sound detector, the motion detector and the temperature sensor to a headrest above a seat inside of the vehicle.

14. The method of claim 12, wherein the activating step includes the steps of:
remotely sending an alarm signal from a wireless transmitter adjacent to the sound detector and the motion detector and the temperature sensor; and
remotely receiving the alarm signal by a wireless receiver located adjacent to a vehicle horn.

15. The method of claim 12, further comprising:
selecting different temperature settings for the temperature sensor based on different vehicle occupants; and
selecting different settings from the different occupants being selected from children, infirm/elderly and pets.

16. The method of claim 12, further comprising the step of:
playing an SOS alarm signal on a vehicle horn when a selected temperature setting has been reached.

17. The method of claim 12, further comprising the step of:
automatically opening at least one of a vehicle window and vehicle door when the detected temperature setting is reached.

18. A vehicle interior temperature alarm system, comprising:
a motion detector and a temperature sensor for sensing motion and temperature inside a vehicle;
a battery power supply for supplying power to the motion detector and the temperature sensor; and
a sound detector for sensing sound inside of the vehicle, with the battery power supply supplying power to the sound detector;
an alarm attached to the sound detector, motion detector and temperature sensor;
a listen mode, wherein the sound detector is turned on to be powered by the battery power supply, and both the motion detector and the temperature sensor are turned off from the battery power supply; and
a temperature sensor power mode, wherein the temperature sensor is turned on when the sound detector picks UP a sound inside of the vehicle; and
a motion detector power on mode, wherein the motion detector is turned on when a selected temperature is detected by the temperature sensor, and
wherein the alarm is activated when motion is detected inside of the vehicle by the motion detector.

19. The vehicle interior temperature alarm system of claim 18, further comprising:
a single housing for the sound detector, the motion detector and the temperature sensor.

* * * * *